United States Patent
Agiwal et al.

(10) Patent No.: US 10,440,565 B2
(45) Date of Patent: *Oct. 8, 2019

(54) SYSTEM AND METHOD OF COUNTER MANAGEMENT AND SECURITY KEY UPDATE FOR DEVICE-TO-DEVICE GROUP COMMUNICATION

(71) Applicant: Samsung Electronics Co., Ltd., Suwon-si, Gyeonggi-do (KR)

(72) Inventors: Anil Agiwal, Suwon-si (KR); Rajavelsamy Rajadurai, Bangalore (IN); Young-bin Chang, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/641,850

(22) Filed: Jul. 5, 2017

(65) Prior Publication Data

US 2017/0303120 A1 Oct. 19, 2017

Related U.S. Application Data

(63) Continuation of application No. 14/821,013, filed on Aug. 7, 2015, now Pat. No. 9,706,396.

(30) Foreign Application Priority Data

Aug. 8, 2014 (IN) .......................... 3917/CHE/2014
Jul. 17, 2015 (IN) .......................... 3917/CHE/2014

(51) Int. Cl.
*H04W 12/04* (2009.01)
*H04L 29/06* (2006.01)
(Continued)

(52) U.S. Cl.
CPC ......... *H04W 12/04* (2013.01); *H04L 63/0428* (2013.01); *H04W 12/0013* (2019.01);
(Continued)

(58) Field of Classification Search
None
See application file for complete search history.

(56) References Cited

U.S. PATENT DOCUMENTS 9,288,756 B2 3/2016 Stojanovski et al.
9,538,371 B2 * 1/2017 Wu ........................ H04W 12/04
(Continued)

OTHER PUBLICATIONS

Qualcomm Incorporated; Using a single group key and bearer level security for ProSe one-to-many communication; 3GPP TSG SA WG3 (Security) Meeting #74; S3-140136; Jan. 20-24, 2014; Taipei, Taiwan.
(Continued)

*Primary Examiner* — Michael J Moore, Jr.
(74) *Attorney, Agent, or Firm* — Jefferson IP Law, LLP

(57) ABSTRACT

A system and a method of counter management and security key update for device-to-device (D2D) communication are provided. The method includes creating by a user equipment, a new packet data convergence protocol (PDCP) entity for a service group wherein a service group is identified by a destination identifier (ID), determining if any PDCP entity of the service group exists or not, generating a new proximity service (ProSe) traffic key (PTK) from a ProSe group key (PGK) corresponding to the service group associated with the new PDCP entity, initializing a new packet counter associated with the service group to zero if the new PDCP entity is a first PDCP entity associated with the service group, generating a ProSe encryption key (PEK) from the PTK and encrypting data packets mapped to the new PDCP entity using the PEK and a packet counter associated with the service group.

14 Claims, 12 Drawing Sheets

(51) Int. Cl.
  *H04W 12/02* (2009.01)
  *H04W 12/00* (2009.01)
  *H04W 76/14* (2018.01)

(52) U.S. Cl.
  CPC ........... *H04W 12/02* (2013.01); *H04L 63/065* (2013.01); *H04L 2463/061* (2013.01); *H04W 76/14* (2018.02)

(56) References Cited

U.S. PATENT DOCUMENTS

| | | | |
|---|---|---|---|
| 9,924,354 B2* | 3/2018 | Zhang | H04W 12/04 |
| 2010/0208632 A1 | 8/2010 | Ray et al. | |
| 2013/0324114 A1 | 12/2013 | Raghothaman et al. | |
| 2015/0305070 A1* | 10/2015 | Ahmad | H04W 76/14 |
| | | | 370/338 |
| 2016/0065362 A1 | 3/2016 | Choyi et al. | |
| 2016/0135243 A1 | 5/2016 | Lei et al. | |
| 2016/0165411 A1 | 6/2016 | Lee et al. | |
| 2016/0183276 A1* | 6/2016 | Marinier | H04W 72/02 |
| | | | 370/329 |
| 2016/0205555 A1* | 7/2016 | Agiwal | H04W 12/04 |
| | | | 713/168 |
| 2016/0261757 A1* | 9/2016 | Rajadurai | H04M 15/61 |
| 2016/0278150 A1 | 9/2016 | Jung et al. | |
| 2016/0344469 A1 | 11/2016 | Yi et al. | |
| 2016/0381543 A1 | 12/2016 | Zhang et al. | |
| 2017/0034865 A1 | 2/2017 | Jung et al. | |

OTHER PUBLICATIONS

Ericsson; Updates to solution #3.6 ProSe One-to-many communication; 3GPP TSG SA WG3 (Security) Meeting #75; S3-140981; May 12-16, 2014; Sapporo, Japan.

Qualcomm Incorporated; Adding solution #3.6 to the ProSe TS; 3GPP TSG SA WG3 (Security) Meeting #75; S3-140987; May 12-16, 2014; Sapporo, Japan.

* cited by examiner

SYSTEM AND METHOD OF COUNTER MANAGEMENT AND SECURITY KEY UPDATE FOR DEVICE-TO-DEVICE GROUP COMMUNICATION

CROSS-REFERENCE TO RELATED APPLICATION(S)

This application is a continuation application of prior application Ser. No. 14/821,013, filed on Aug. 7, 2015, which claimed the benefit under 35 U.S.C. § 119(a) of an Indian Provisional Patent Application filed on Aug. 8, 2014 in the Indian Intellectual Property Office and assigned Serial No. 3917/CHE/2014, and of an Indian Complete Patent Application filed on Jul. 17, 2015 in the Indian Intellectual Property Office and assigned Serial No. 3917/CHE/2014, the entire disclosure of each of which is hereby incorporated by reference.

TECHNICAL FIELD

The present disclosure relates to wireless communication systems. More particularly, the present disclosure relates to a system and method of counter management and security key update for device-to-device (D2D) group communication.

BACKGROUND

Proximity-based applications and proximity services (ProSe) represent a fast growing social and technological trend that may have a major impact on the evolution of cellular wireless/mobile broadband technologies. These services are based on the awareness of two devices or two users being close to each other and may include such applications as public safety operations, social networking, mobile commerce, advertising, gaming, etc. D2D discovery is the first operation to enable D2D service. D2D communication is being studied in communication standards groups to enable discovery and data communication services between user equipments (UEs). During the D2D group communication, a transmitting D2D UE can transmit data packets to one or more D2D UEs belongs to a group or broadcast data packets to all the D2D UEs in proximity or send unicast data packets to a specific D2D UE. A destination identifier (ID) in the transmitted data packet identifies the intended recipient of the data packet. The destination ID can be one of unicast ID, broadcast ID or Group ID.

During ProSe-based D2D group communication, the data being transmitted within the group should be secured (i.e., confidentiality protected) from non-group UEs. In order to support the security, various types of keys with a hierarchy are generated and provided to the UEs which are members of a group, so that only the members of the ProSe group can participate in the communication.

FIG. 1 illustrates a diagram depicting a key hierarchy for D2D group communication according to the related art.

Referring to FIG. 1, a ProSe group key (PGK) 102 is defined, wherein the PGK 102 can be specific to a group of D2D UEs. Multiple PGKs per group can be pre-provisioned in UE. Each of these PGKs for the same group is identified using an 8 bit PGK ID. Each PGK 102 also has an associated expiry time. If any UE within the group wants to send data packets to one or more other UEs of the group, then a ProSe traffic key (PTK) 104 can be derived from the PGK 102 corresponding to that group using a key derivation function (KDF). The PTK 104 is identified using a PTK ID. The PTK 104 is a group member specific key generated from the PGK 102. Each PTK 104 is also associated with a 16 bit counter, wherein the counter specifies the packet count. For encrypting data, <PTK, Counter> needs to be unique. The counter is updated for every packet transmitted. If the counter rolls over then a new PTK 104 is generated from the PGK 102.

PTK=KDF (PGK, PTK ID, group member identity of transmitter).

Further, a ProSe encryption key (PEK) 106 is also generated whenever PTK 104 is generated.

PEK=KDF (PTK, Algorithm ID), wherein the Algorithm ID identifies the security algorithm. The PGK ID, PTK ID and counter values are transmitted along with the encrypted data packet.

During the data transmission, an internet protocol (IP) packet is received from the upper layer. The IP packet (or packet data convergence protocol (PDCP) service data unit (SDU)) is first processed by a PDCP entity. The PDCP entity applies the header compression, sequence numbering and security to the PDCP SDU and generates the PDCP protocol data unit (PDU). The PDCP PDU (or radio link control (RLC) SDU) is then processed by an RLC entity. The RLC entity performs fragmentation functions and generates the RLC PDU. The RLC PDU (or medium access control (MAC) SDU) is then used by a MAC entity to generate the MAC PDU. The MAC PDU is then transmitted by the physical layer on the radio channel During the data transmission, a UE may be transmitting to multiple destinations concurrently. Therefore, multiple PDCP/RLC entities are created. One PDCP entity and RLC entity corresponds to one destination and processes the packets corresponding to an associated destination.

During the data transmission, the UE can also transmit different types (e.g., voice, data) of data traffic to the same destination (for example to same group ID). So, multiple PDCP and RLC entities are created corresponding to same destination. In the MAC layer, a MAC SDU or an RLC PDU corresponding to different RLC entities is identified using a logical channel identity (LCID). The LCID is included in the MAC layer in the MAC header. As per the current specified key hierarchy, one PTK and one counter are used by a transmitter for one destination. This works when there is only one PDCP/RLC entity in the transmitter corresponding to the destination wherein the counter is the same as a PDCP sequence number (SN) and one PTK corresponding to the destination. If there are multiple PDCP/RLC entities per destination, then enhanced methods are needed for counter and PTK maintenance (for example, to prevent reuse of same PEK and count as input for encryption). That is, the current scheme has a limitation in that it cannot support multiple PDCP entities per destination.

So a method of counter and security key maintenance in a system in which a UE can transmit different traffic types or traffic of different priority to the same destination (and hence has multiple PDCP/RLC entities per destination or per group ID) is needed.

Further, it is possible to mount a replay attack on a particular ProSe communication, since any UE can transmit the packet and there is no signaling between the UEs before communication. Considering the sensitivity of ProSe public safety communication, a replay attack is a big security threat. So a method of mitigating the security threat in a system in which a UE can transmit user traffic directly is also needed.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and system of counter management and security key update for device-to-device (D2D) group communication.

In accordance with an aspect of the present disclosure, a method for providing data encryption in a D2D group communication is provided. The method includes creating, by a user equipment (UE), a new packet data convergence protocol (PDCP) entity for a service group wherein a service group is identified by a destination identifier (ID), determining if any PDCP entity of the service group exists or not, generating a new proximity service (ProSe) traffic key (PTK) from a ProSe group key (PGK) corresponding to the service group associated with the new PDCP entity, initializing a new packet counter associated with the service group to zero if the new PDCP entity is a first PDCP entity associated with the service group, generating a ProSe encryption key (PEK) from the PTK and encrypting data packets mapped to the new PDCP entity using the PEK and a packet counter associated with the service group.

According to an embodiment of the present disclosure, the UE is adapted to maintain a single packet counter for one or more PDCP entities associated with the service group. Further, the UE is also adapted to update the packet counter for each data packet received for the service group.

According to an embodiment of the present disclosure, the method further comprises using one of a PTK or a PEK used by an existing PDCP entity of the service group for encrypting data packets mapped to the new PDCP entity, if another PDCP entity associated with the service group already exists.

According to an embodiment of the present disclosure, the new PTK and new PEK are generated when the new PDCP entity created for the service group is the first PDCP entity for the service group. Further, the new PTK and new PEK are generated when the new PDCP entity created for the service group is the first PDCP entity for the service group and the PTK for the service group does not exist.

According to an embodiment of the present disclosure, the method further comprises releasing the PTK and PEK generated for the service group when a plurality of existing PDCP entities associated with the service group are released.

In accordance with another aspect of the present disclosure, a system for providing data encryption in D2D group communication is provided. The system includes a UE configured to create a new PDCP entity for a service group, wherein the service group is identified by a destination ID, determine if any PDCP entity of the service group exists or not, generate a new PTK from a PGK corresponding to the service group associated with the new PDCP entity if the new PDCP entity is the first PDCP entity associated with the service group, generate a PEK from the generated PTK if the new PDCP entity is the first PDCP entity associated with the service group, initialize a new packet counter corresponding to the new PDCP entity to zero and encrypt data packets mapped to the new PDCP entity using the PEK associated with the service group, the packet counter corresponding to the new PDCP entity for the service group and logical channel ID of the logical channel associated with the new PDCP entity for the service group.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
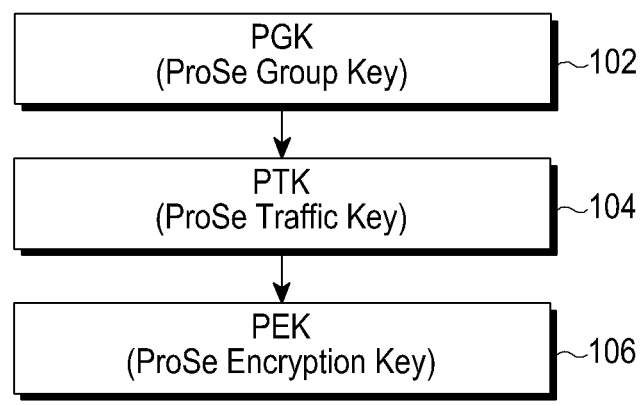
FIG. 1 illustrates a diagram depicting a key hierarchy for device-to-device (D2D) group communication according to the related art.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The specification may refer to "an", "one" or "some" embodiment(s) in several locations. This does not necessarily imply that each such reference is to the same embodiment(s), or that the feature only applies to a single embodiment of the present disclosure. Single features of different embodiments may also be combined to provide other embodiments of the present disclosure.

It will be further understood that the terms "includes", "comprises", "including" and/or "comprising" when used in this specification, specify the presence of stated features, integers, operations, elements and/or components, but do not preclude the presence or addition of one or more other features integers, operations, elements, components, and/or groups thereof. As used herein, the term "and/or" includes any and all combinations and arrangements of one or more of the associated listed items.

According to an embodiment of the present disclosure, the terms device-to-device (D2D) communication, proximity service (ProSe) communication and ProSe communication mean the same and are used interchangeably in this specification. Also, the terms D2D device, ProSe enabled user equipment (UE), UE and ProSe capable UE mean the same and are used interchangeably in this specification. Further, the term destination identifier (ID) may be a group ID during group communication, unicast ID during unicast communication, or broadcast ID during broadcast communication.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present disclosure aims at enhancing security to support multiple packet data convergence protocol (PDCP)/radio link control (RLC) entities per destination or group during D2D communication by improving the data encryption method, handling of security keys and management of PDCP sequence counter. The present disclosure includes a method and system of counter management, security key handling and data encryption for D2D communication. Various embodiments are described in the present disclosure to describe the working of the method, but not to limit the scope of the present disclosure.

According to an embodiment of the present disclosure, a method for providing data encryption in D2D communication comprises the operation of UE creating a new PDCP entity for a service group, wherein the service group is identified by a destination ID (or group ID). A UE can create multiple PDCP entities for the same service group wherein data packets of different traffic types (e.g., voice, data) or priorities are mapped or processed by different PDCP entities. A UE can also be transmitting packets to multiple service groups wherein the UE creates one or more PDCP entities for each service group.

In an operation, it is determined if any PDCP entity corresponding to the service group of a newly created PDCP entity exists or not. The determination of the PDCP entity associated with the service group can be done using any of known techniques, without departing from the scope of the disclosure.

In an operation, a new ProSe traffic key (PTK) can be generated from a ProSe group key (PGK) corresponding to the service group associated with the new PDCP entity created by the UE, if the new PDCP entity is the first PDCP entity associated with the service group. The UE maintains a single PTK across a plurality of PDCP entities corresponding to a service group.

In an operation, a new packet counter associated with the service group can be initialized to zero if the new PDCP entity is the first PDCP entity associated with the service group. The counter is updated for every packet received from an upper layer for any PDCP entity corresponding to the service group. The counter can be added to a PDCP header by the PDCP entity. The UE maintains a single packet counter across a plurality of PDCP entities corresponding to a service group.

In an operation, a ProSe encryption key (PEK) can be generated from the PTK, if the new PDCP entity is the first PDCP entity associated with the service group. The UE maintains a single PEK across a plurality of PDCP entities corresponding to a service group. In an operation, data mapped to the new PDCP entity can be encrypted using the PEK associated with the service group of the new PDCP entity and the packet counter associated with the service group.

In an embodiment of the present disclosure, the UE maintains a single packet counter across a plurality of PDCP entities corresponding to a single group ID or destination ID. Further, in an embodiment of the present disclosure, the UE updates the packet counter for every data packet received for a PDCP entity corresponding to the group. In another embodiment of the present disclosure, the transmitting UE can use one of a PTK or a PEK corresponding to the PDCP entity, if the PDCP entity associated with a destination ID of the group already exists.

In an embodiment of the present disclosure, the new PTK is generated when other PDCP entities associated with the destination ID of the group is present.

In an embodiment of the present disclosure, the PTK is generated when the first PDCP entity is created for the destination ID of the group.

In an embodiment of the present disclosure, the PEK is generated when the first PDCP entity is created for the first destination ID and the PEK does not exist.

In an embodiment of the present disclosure, the UE can release at least one of the PTK or PEK associated with the destination ID of the first group when the plurality of PDCP entities corresponding to the destination ID are released.

In an embodiment of the present disclosure, a security key (i.e., PEK/PTK) is generated whenever the first PDCP entity is created for a group. If at least one PDCP entity already exists for a group, then, at the time of creation of a new PDCP entity, the new security key (i.e., PTK/PEK) is not generated. The security key used for existing PDCP entity is used for new PDCP entity.

In an embodiment of the present disclosure, a counter is maintained for each PDCP entity. This means that multiple counters are maintained for a PTK/PEK.

In an embodiment of the present disclosure, each packet in a PDCP entity is encrypted using parameters such as a security key (PEK), a counter, and a logical channel ID (LCID). The LCID is the ID of a logical channel in a medium access control (MAC) layer which carries the packet corresponding to this PDCP entity. By using the LCID of a MAC layer, the key stream for ciphering at the PDCP layer is not repeated.

In an embodiment of the present disclosure, the PTK/PEK is not released whenever the PDCP entity is released. The PTK/PEK is released when all PDCP entities corresponding to the group are released.

Figure 2:
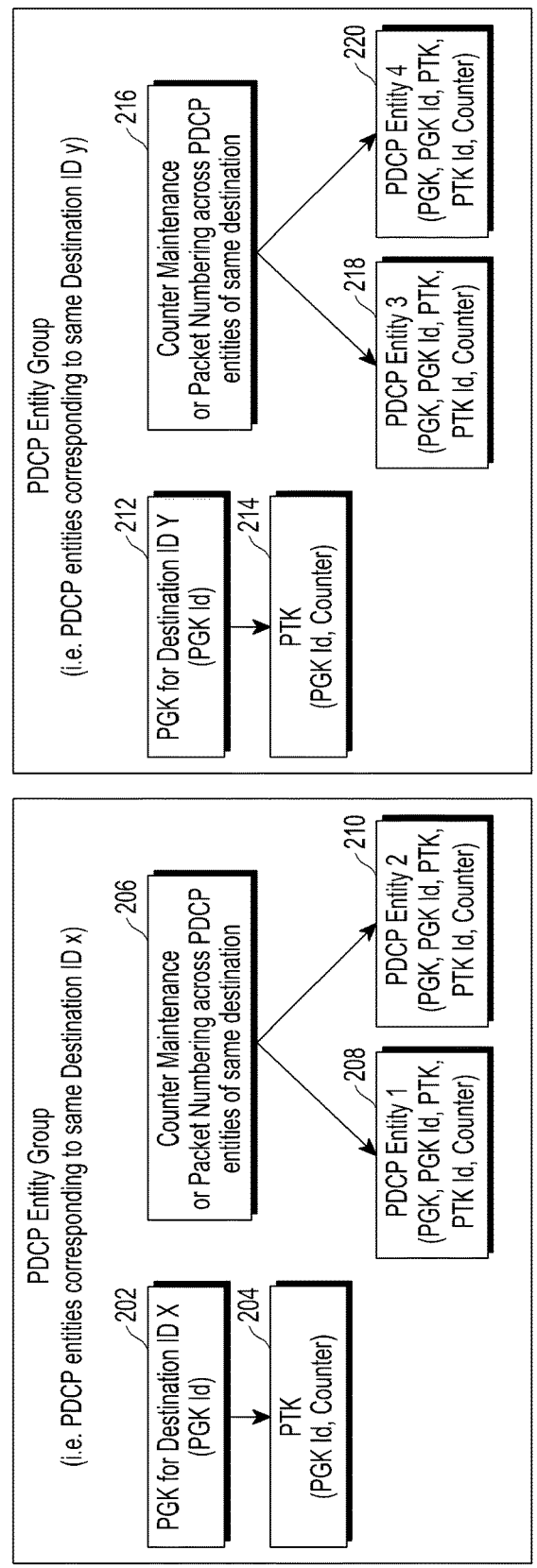
FIG. 2 illustrates a schematic diagram depicting counter maintenance from a single counter across packet data convergence protocol (PDCP) entities associated with the same destination according to an embodiment of the present disclosure.

FIG. 2 illustrates a schematic diagram depicting counter maintenance from a single counter across the PDCP entities associated with the same destination according to an embodiment of the present disclosure. The diagram depicts that a transmitter UE maintains a single counter across all PDCP entities corresponding to same destination i.e., group.

Referring to FIG. 2, a group communication is being established between more than two UEs and a PGK 202 provisioned for the destination with destination ID, ID X. The PGK may include a PGK ID that identifies the respective PGK. From the PGK, a PTK 204 is derived, wherein the PTK may include a PTK ID. Further, the PTK may include a counter value. The counter is updated for every packet received from an upper layer for any PDCP entity corresponding to the destination.

Further, the PDCP entity may include a counter maintenance entity 206 that maintains a single counter across two PDCP entities, a PDCP entity 1 208 and a PDCP entity 2 210, wherein the PDCP entity 1 208 and the PDCP entity 2 210 may include the same values such as, PGK, PGK ID, PTK and PTK ID. The PDCP entity receives a counter from the counter maintenance entity 206 corresponding to the destination associated with the PDCP entity and the PDCP counter can be added to the PDCP entity. The counter maintenance entity 206 exists for all PDCP entities associated with the same destination. Whenever the counter rolls over for a destination, a fresh PTK/PEK is generated again corresponding to the destination.

Similarly, a PGK 212 can be established from a PDCP entity by the transmitting UE for the destination with destination ID, ID Y. The PGK may include a PGK ID that identifies the respective PGK. From the provisioned PGK for the destination ID, ID Y, PTK 214 can be created, wherein the PTK 214 may include a PTK ID. The PTK 214 may also include a counter value. The counter is updated for every packet received from an upper layer for any PDCP entity corresponding to the destination. The PDCP entity may include a counter maintenance entity 216 that maintains single counter across two PDCP entities, PDCP entity 3 218 and PDCP entity 4 220, wherein the PDCP entity 3 218 and the PDCP entity 4 220 comprise of same values such as, PGK, PGK ID, PTK and PTK ID.

As the present disclosure mainly describes PDCP entity creation, and data encryption, the herein below described description with respect to the diagrams depicts a PDCP entity creation along with other embodiments of the present disclosure.

Figure 3:
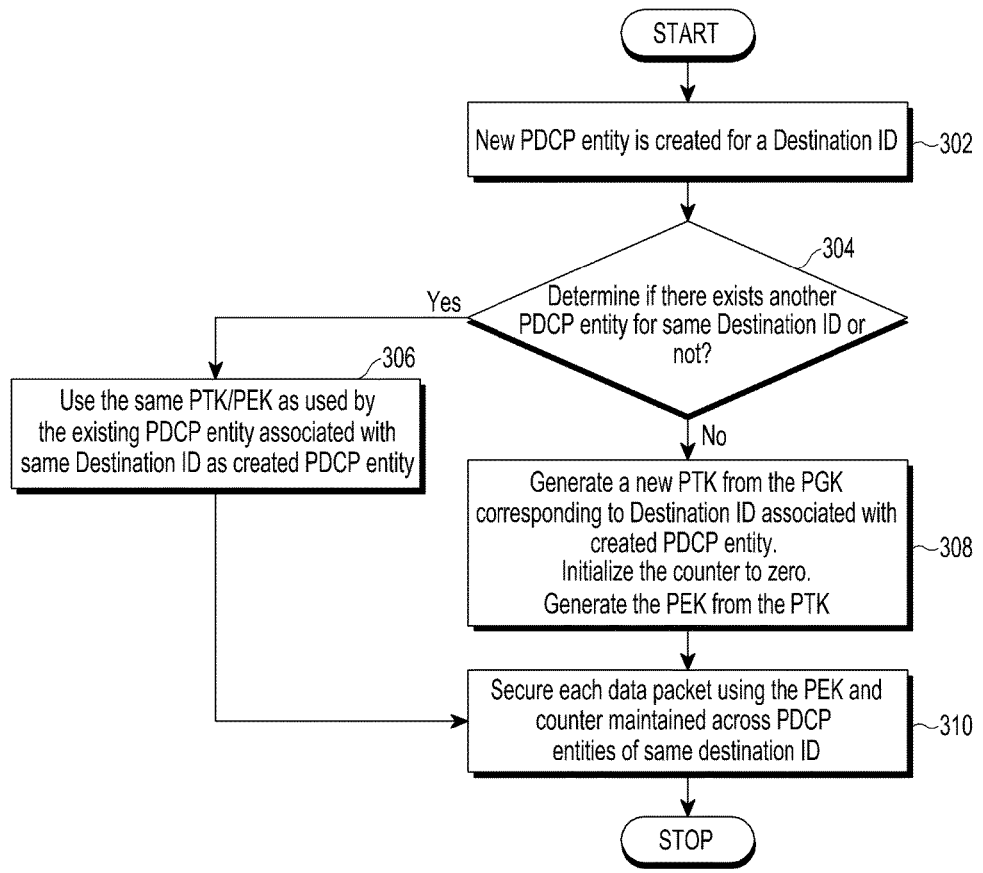
FIG. 3 illustrates a flow diagram depicting transmitting a user equipment (UE) operation with respect to counter and security maintenance when a PDCP entity is created according to an embodiment of the present disclosure.

FIG. 3 illustrates a flow diagram depicting a transmitting UE operation with respect to counter and security mainte-nance when a PDCP entity is created according to an embodiment of the present disclosure.

Referring to FIG. 3, at operation 302, a new PDCP entity can be created for a destination with a destination ID. The transmitting UE can create the new PDCP entity for the destination with the destination ID. At operation 304, it is determined whether another PDCP entity exists for the same destination (identified by destination ID) or not. A purpose of the determination is to avoid generation of multiple of PTKs/PEKs/counters for the same destination.

If the transmitting UE identifies that one or more other PDCP entities exists for the same destination, then at operation 306, the PTK/PEK used by an existing PDCP entity associated with the same destination as a newly created PDCP entity is used by the newly created PDCP entity. If the transmitting UE identifies that there is no other PDCP entity existing for the destination, then at operation 308, a new PTK can be generated from the PGK corresponding to the destination associated with the created PDCP entity. Further, the counter value can be initialized to zero and a PEK can also be generated for the respective PTK.

At operation 310, each data packet is secured/protected/encrypted using the PEK generated from either operation 306 and/or 308, along with the monotonically incrementing count maintained across PDCP entities of the same destination ID as input to an encryption algorithm.

According to an embodiment of the present disclosure, a PTK/PEK corresponding to a destination can be released when all PDCP entities associated with the destination are released. According to an embodiment of the present disclosure, one of a PTK and a PEK corresponding to the PDCP entity can be used, if the PDCP entity associated with a destination ID of the first group already exists.

Figure 4:
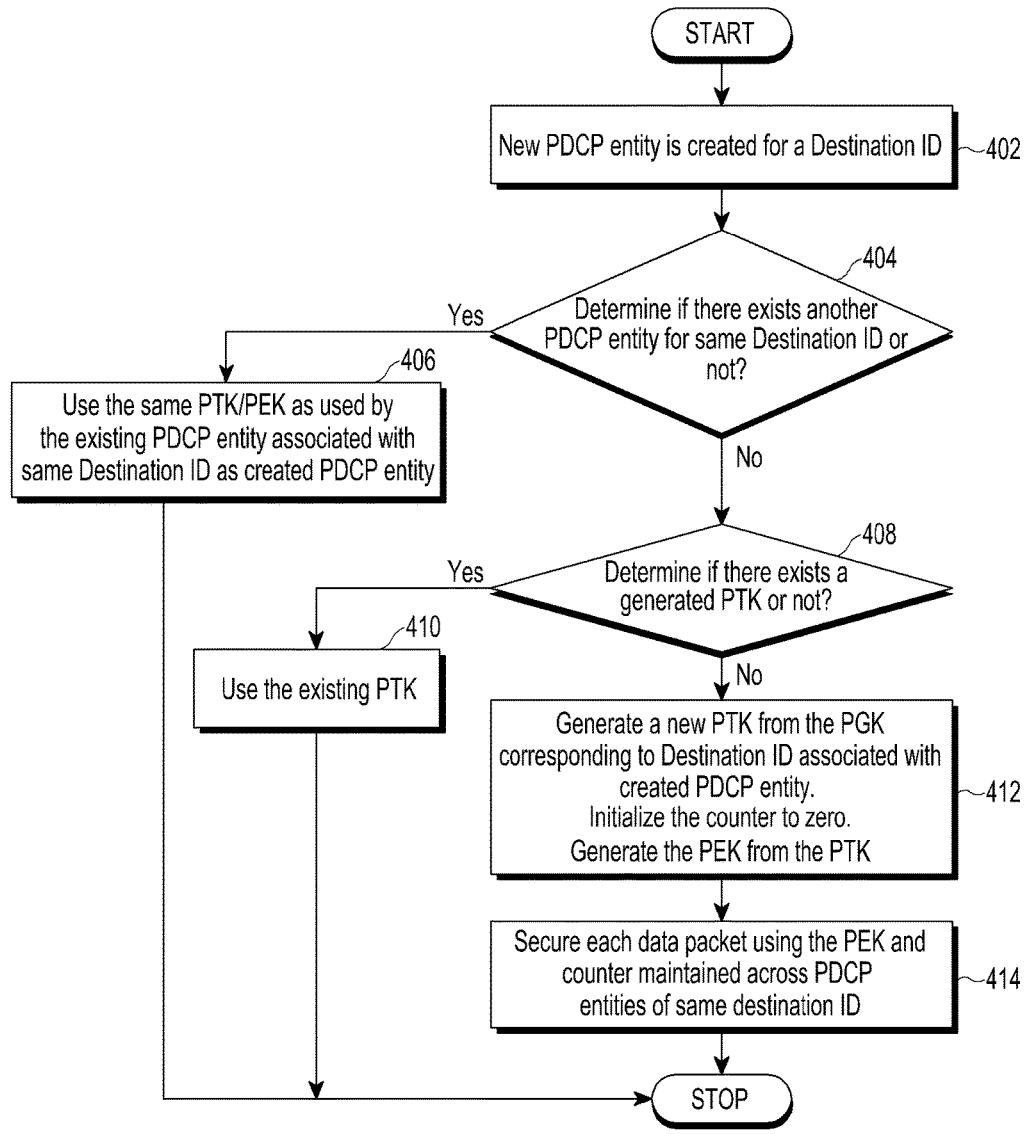
FIG. 4 illustrates a flow diagram depicting a transmitting UE operation with respect to counter and security maintenance when a PDCP entity is created according to an embodiment of the present disclosure.

FIG. 4 illustrates a flow diagram depicting a transmitting UE operation with respect to counter and security maintenance when a PDCP entity is created according to an embodiment of the present disclosure. According to the present embodiment of the present disclosure, it is assumed that PTK/PEK corresponding to a destination is not released when all PDCP entities associated with a destination are released.

Referring to FIG. 4, at operation 402, a new PDCP entity can be created by a transmitting UE for a destination with destination ID. At operation 404, it is determined whether any other PDCP entity for the same destination (identified by destination ID) exists or not. If one or more PDCP entities exist for the same destination with the destination ID, then at operation 406, a PTK/PEK used by an existing PDCP entity associated with the same destination as a newly created PDCP entity is used by the newly created PDCP entity.

If no other PDCP entity exists for the same destination with the destination ID, then at operation 408, the UE can further check whether a generated PTK/PEK exists or not. If the generated PTK/PEK still exists with the UE, then at operation 410, the UE can use the same PTK/PEK. If the generated PTK does not exist with the UE, then at operation 412, a new PTK can be generated from the PGK corresponding to the destination with the destination ID associated with the created PDCP entity. Further, the UE can initialize the counter with value zero and generate a PEK from the PTK.

At operation 414, the UE can secure each data packet using the PEK and the counter that is maintained across PDCP entities of same destination with the destination ID.

It is to be noted that the PDCP entities created for the data transfer within the same destination have to be released once the data is being transmitted and being decrypted by the destination. The following description with respect to FIG. 5 illustrates releasing of a PDCP entity.

Figure 5:
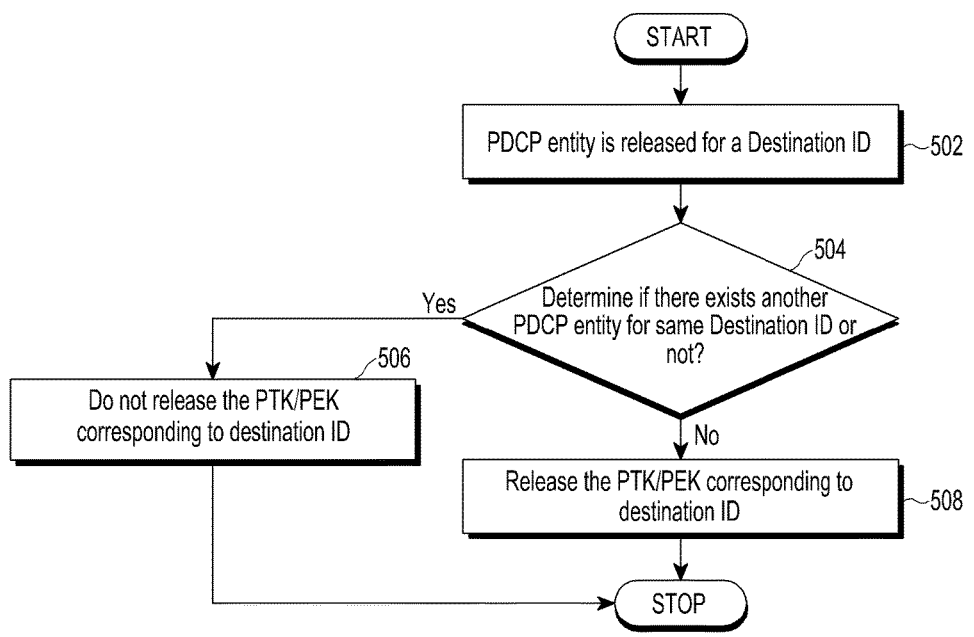
FIG. 5 illustrates a flow diagram depicting a transmitting UE operation with respect to counter and security maintenance when a PDCP entity is released according to an embodiment of the present disclosure.

FIG. 5 illustrates a flow diagram depicting a transmitting UE operation with respect to counter and security maintenance when a PDCP entity is released according to an embodiment of the present disclosure.

Referring to FIG. 5, at operation 502, a PDCP entity can be released for a service group wherein a service group is identified by a destination ID. At operation 504, the transmitting UE determines whether any other PDCP entity for the same destination with the destination ID exists or not. If any other PDCP entity for the same destination exists, then at 506, the transmitting UE does not release/delete the PTK/PEK corresponding to the destination ID so that the same PTK/PEK can be used for ongoing communication (other PDCP entity for the same service group might using it).

If the transmitting UE identifies that there are no other PDCP entities existing for the same destination with the destination ID, then the UE understands that all the data packets are being transmitted to the destination. Therefore, at operation 508, the transmitting UE can release the PTK/PEK corresponding to the destination with the destination ID. In an embodiment of the present disclosure, the counter indicating the packet count is also released while releasing the PDCP entity for the corresponding destination with destination ID.

According to an embodiment of the present disclosure, a method for providing data encryption in D2D group communication comprises the operations of a UE creating a new PDCP entity for a service group, wherein a service group is identified by destination ID. For every group that includes more than two UEs, one of UE in the group can create one or more new PDCP entities within the group, wherein the UE that generates the PDCP entity can be a transmitting UE that transmits data packets. Alternatively, the UE in the group can create one or more new PDCP entities within the group, wherein the UE that generates the PDCP entity can be a receiver (received a packet which belongs to the group). The PDCP entity can be associated with a destination along with a destination ID defined by the transmitting UE.

In an operation, it is determined if any PDCP entity corresponding to the service group of a newly created PDCP entity exists or not. In an embodiment of the present disclosure, the determination of the PDCP associated with the service group can be done using any of the known techniques, without departing from the scope of the disclosure.

In an operation, a new PTK can be generated from a PGK corresponding to the service group associated with the new PDCP entity if the new PDCP entity is the first PDCP entity associated with the service group. In an operation, a PEK can be generated from the PTK if the new PDCP entity is the first PDCP entity associated with the service group. The PTK derives a new PEK for the group communication. The UE maintains a single PTK across a plurality of PDCP entities corresponding to a service group.

In an operation, a new packet counter can be initialized corresponding to the new PDCP entity to zero. In an operation, data mapped to the new PDCP entity can be encrypted using the PEK associated with the service group, the packet counter corresponding to the new PDCP entity for the service group and the LCID of the logical channel associated with the new PDCP entity for the said service group.

According to an embodiment of the present disclosure, a PDCP entity can employ one of an LCID corresponding to the destination ID flow as input to the encryption algorithm for encrypting the data. The LCID is employed for an embodiment where the PDCP entity maintains its own counter (not from the counter maintenance entity), in order to prevent key stream reuse, thereby enhancing the data security. Key stream reuse occurs if the same PEK and count are used by different PDCP entities.

According to an embodiment of the present disclosure, the method can further include using the PTK as used by the existing PDCP entity associated with the service group of a newly created PDCP entity, if another PDCP entity associated with the service group already exists. In an operation, the UE determines if the PTK is the same as the previous PTK used for the PDCP entity. In an operation, the UE initializes the packet counter value to the packet counter value last used for the PDCP entity.

The method can further release the PTK associated with the destination ID, only when the plurality of PDCP entities associated with the same destination ID is released.

According to an embodiment of the present disclosure, an independent counter is maintained at each PDCP entity. The counter is monotonically incremented for every packet received from an upper layer by the PDCP entity. Whenever the counter rolls over, a PTK/PEK corresponding to the destination associated with the PDCP entity can be newly generated and used for further communication along with the counter being restarted again. According to an embodiment of the present disclosure, the method can use the LCID as an additional input in encryption method, because <PTK/PEK, Count> can be the same across PDCP entities. The MAC layer maintains the LCID corresponding to each PDCP/RLC entity, wherein the PDCP entity can obtain the LCID corresponding to a logical channel associated with it from the MAC layer. The method will be explained with reference to FIGS. 6A to 6C and FIGS. 7A to 7C.

Figure 6A:
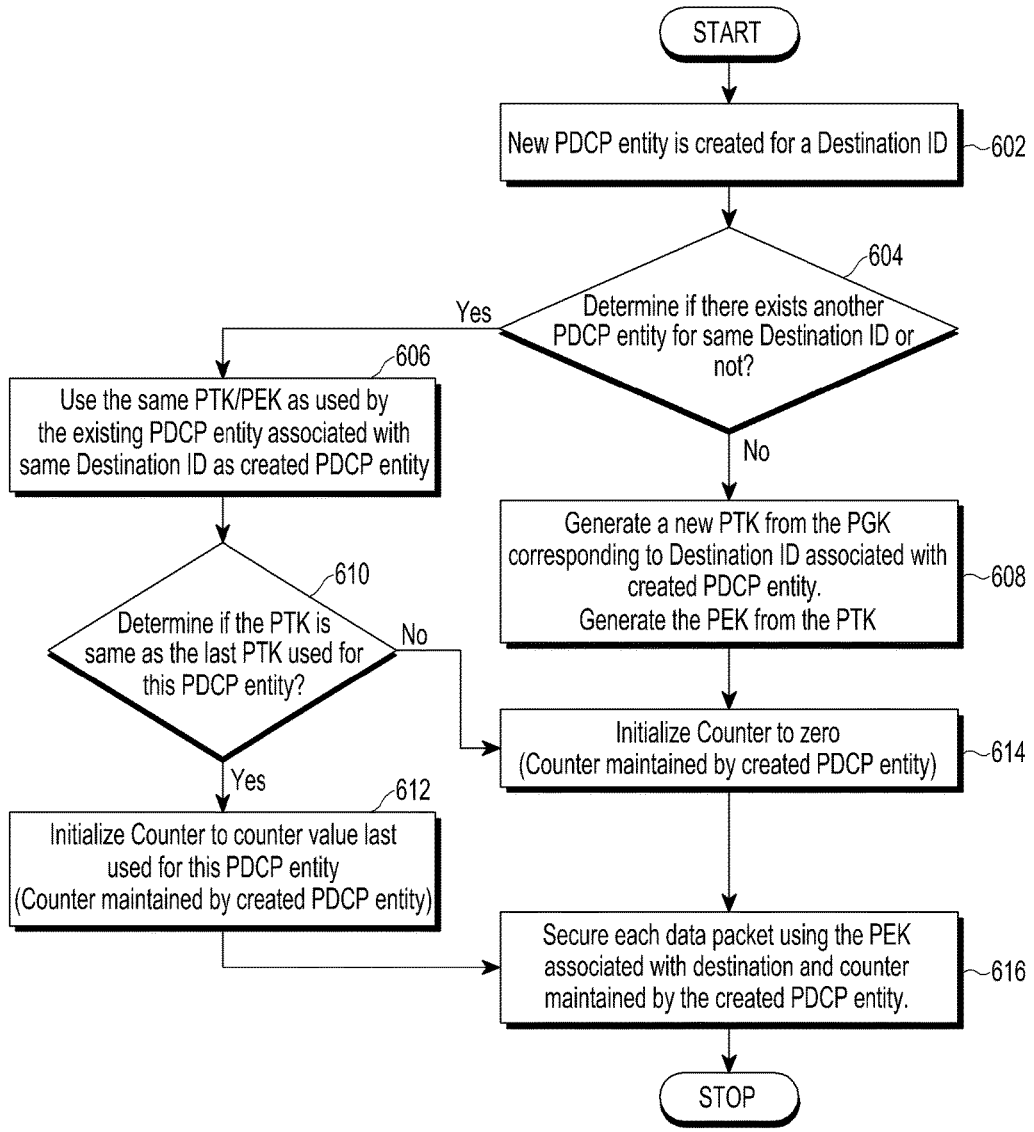
FIG. 6A illustrates a flow diagram depicting a transmitting UE operation with respect to counter and security maintenance when a PDCP entity is created according to an embodiment of the present disclosure.

FIG. 6A illustrates a flow diagram depicting a transmitting UE operation with respect to counter and security maintenance when a PDCP entity is created according to an embodiment of the present disclosure.

Referring to FIG. 6A, at operation 602, a new PDCP entity can be created for a destination with a destination ID. The transmitting UE can create the new PDCP entity for the destination with the destination ID. At operation 604, it is determined whether another PDCP entity exists for the same destination with same destination ID or not. A purpose of the determination is to avoid duplication of PDCP entities along with security keys and a counter for data encryption and transmission.

If the transmitting UE identifies that one or more other PDCP entities exist for the destination, then at operation 606, the same PTK/PEK can be used as used by the existing PDCP entity associated with the same destination with the destination ID by the newly created PDCP entity. If the transmitting UE identifies that there is no other PDCP entity existing for the destination, then at operation 608, a new PTK can be generated from the PGK corresponding to the destination with the destination ID associated with the created PDCP entity. Further, a PEK can also be generated for the respective PTK. At operation 614, the counter value can be initialized to zero. The counter is maintained by the created PDCP entity. At operation 616, each data packet can be secured using the PEK associated with the destination, the LCID of the logical channel associated with the new PDCP entity for the service group and the counter maintained by the created PDCP entity.

At operation 610, when the same PTK is used by the existing PDCP entity, the UE determines whether the PTK used by the PDCP entity is same as the last used PTK. If yes, then at operation 612, the UE initialize a counter value that was last used for the PDCP entity, wherein the counter can be maintained by the created PDCP entity. Further, at operation 616, each data packet can be secured using the PEK associated with the destination and the counter maintained by the created PDCP entity.

If the PTK used by the PDCP entity is not same as the last used PTK, then at operation 614, the counter value can be initialized to zero. At operation 616, each data packet can be secured using the PEK associated with the destination, the LCID of the logical channel associated with the new PDCP entity for the service group and the counter maintained by the created PDCP entity.

Figure 6B:
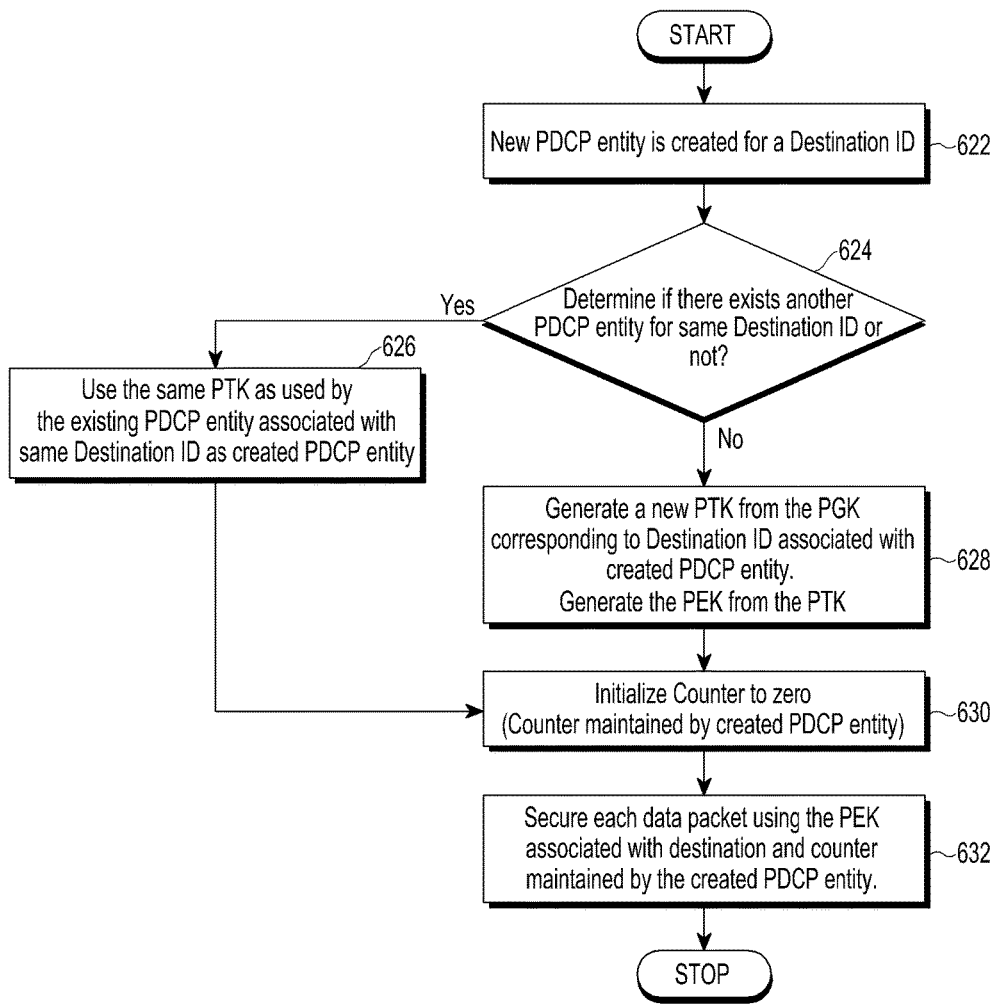
FIG. 6B illustrates a flow diagram depicting a transmitting UE operation with respect to counter and security maintenance when a PDCP entity is created according to an embodiment of the present disclosure.

FIG. 6B illustrates a flow diagram depicting a transmitting UE operation with respect to counter and security maintenance when a PDCP entity is created according to an embodiment of the present disclosure.

Referring to FIG. 6B, it is assumed that the counter value associated with the PDCP entity and PTK used is stored when the PDCP entity is released. However, when all PDCP entities associated with the destination are released, then the stored value is removed. It is also assumed that the PTK associated with a destination is released when all PDCP entities associated with the same destination are released. At operation 622, a new PDCP entity can be created for a destination with a destination ID. The transmitting UE can create the new PDCP entity for the destination with the destination ID. At operation 624, it is determined whether another PDCP entity exists for the same destination with the same destination ID or not. A purpose of the determination is to avoid duplication of PDCP entities along with security keys and the counter for data encryption and transmission.

If the transmitting UE identifies that one or more other PDCP entities exist for the destination, then at operation 626, the same PTK/PEK can be used by the existing PDCP entity associated with the same destination with the destination ID as a newly created PDCP entity. At operation 630, the counter value can be initialized to zero. If the transmitting UE identifies that there is no other PDCP entity existing for the destination, then at operation 628, a new PTK can be generated from the PGK corresponding to the destination with the destination ID associated with the created PDCP entity. Further, a PEK can also be generated for the respective PTK. At operation 630, the counter value can be initialized to zero. At operation 632, each data packet can be secured using the PEK associated with the destination, the LCID of the logical channel associated with the new PDCP entity for the service group, and the counter (maintained by the created PDCP entity).

Figure 6C:
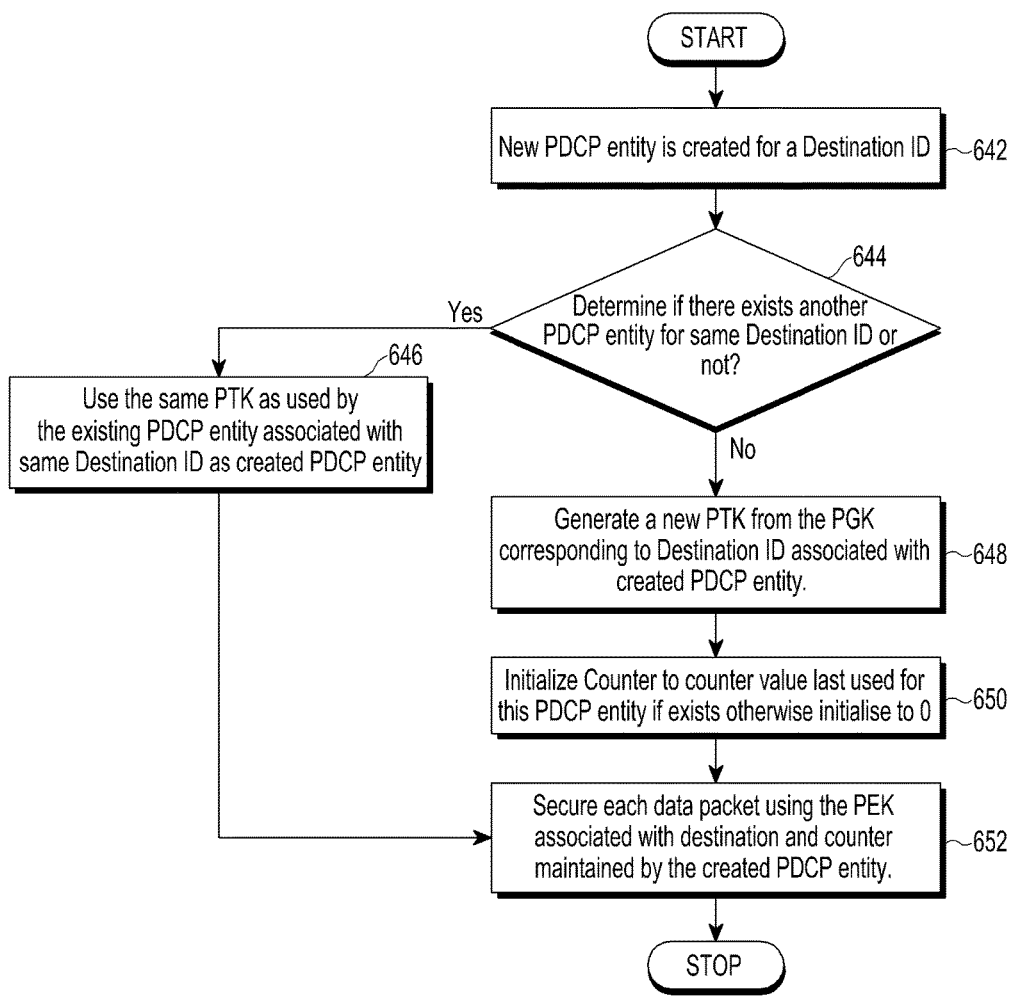
FIG. 6C illustrates a flow diagram depicting a transmitting UE operation with respect to counter and security maintenance when a PDCP entity is created according to an embodiment of the present disclosure.

FIG. 6C illustrates a flow diagram depicting a transmitting UE operation with respect to counter and security maintenance when a PDCP entity is created according to an embodiment of the present disclosure.

Referring to FIG. 6C, at operation 642, a new PDCP entity can be created for a destination with a destination ID. The transmitting UE can create the new PDCP entity for the destination with the destination ID. At operation 644, it is determined whether another PDCP entity exists for the same destination with the same destination ID or not. A purpose of the determination is to avoid duplication of PDCP entities along with the counter for data encryption and transmission.

If the transmitting UE identifies that one or more other PDCP entities exist for the destination, then at operation 646, the same PTK/PEK can be used by the newly created PDCP entity as used by the existing PDCP entity associated with the same destination with the destination ID. At operation 652, each data packet can be secured using the PEK associated with the destination and the counter can be maintained by the created PDCP entity.

If the transmitting UE identifies that there is no other PDCP entity existing for the destination, then at operation 648, a new PTK can be generated from the PGK corresponding to the destination with destination ID associated with the created PDCP entity. At operation 650, the counter value can be initialized to the counter value last used for this PDCP entity if exists. If the last used counter value does not exist, then value 0 is initialized to the counter. At operation 652, each data packet can be secured using the PEK associated with destination, the LCID of the logical channel associated with the new PDCP entity for the service group and the counter (maintained by the created PDCP entity).

Figure 7A:
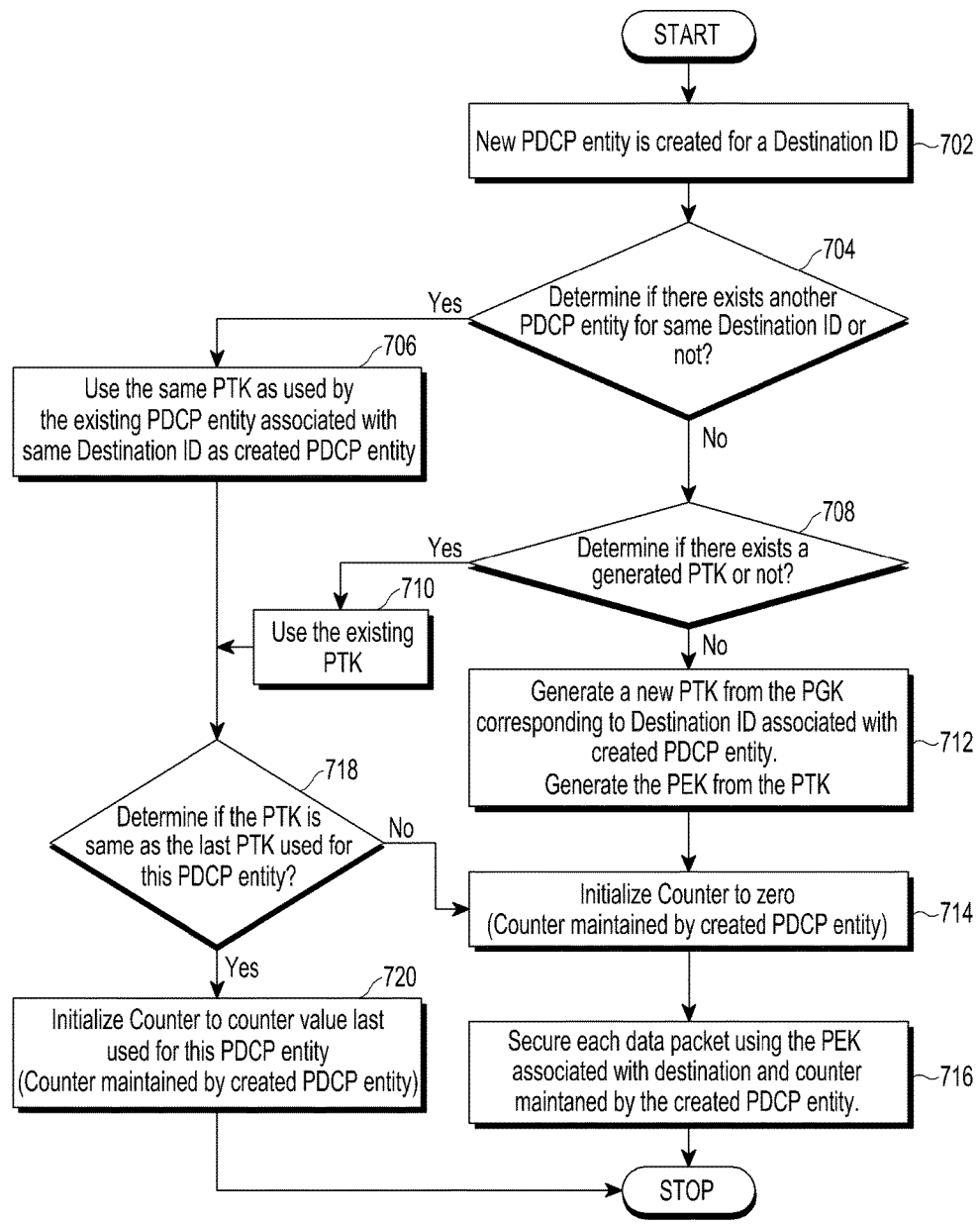
FIGS. 7A, 7B, and 7C illustrate a flow diagram depicting a transmitting UE operation with respect to counter and security maintenance when a PDCP entity is created according to various embodiments of the present disclosure.
Figure 7B:
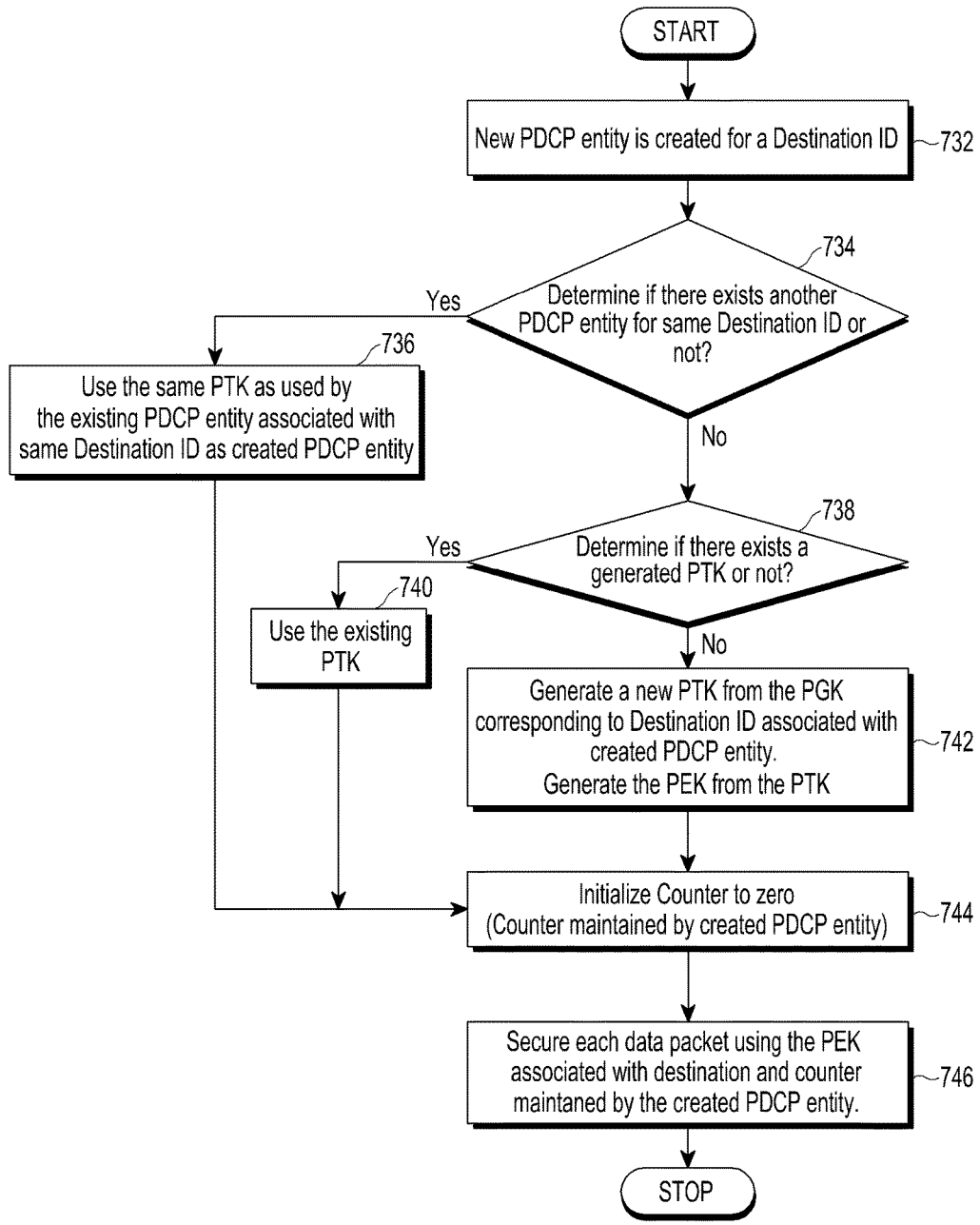
Figure 7C:
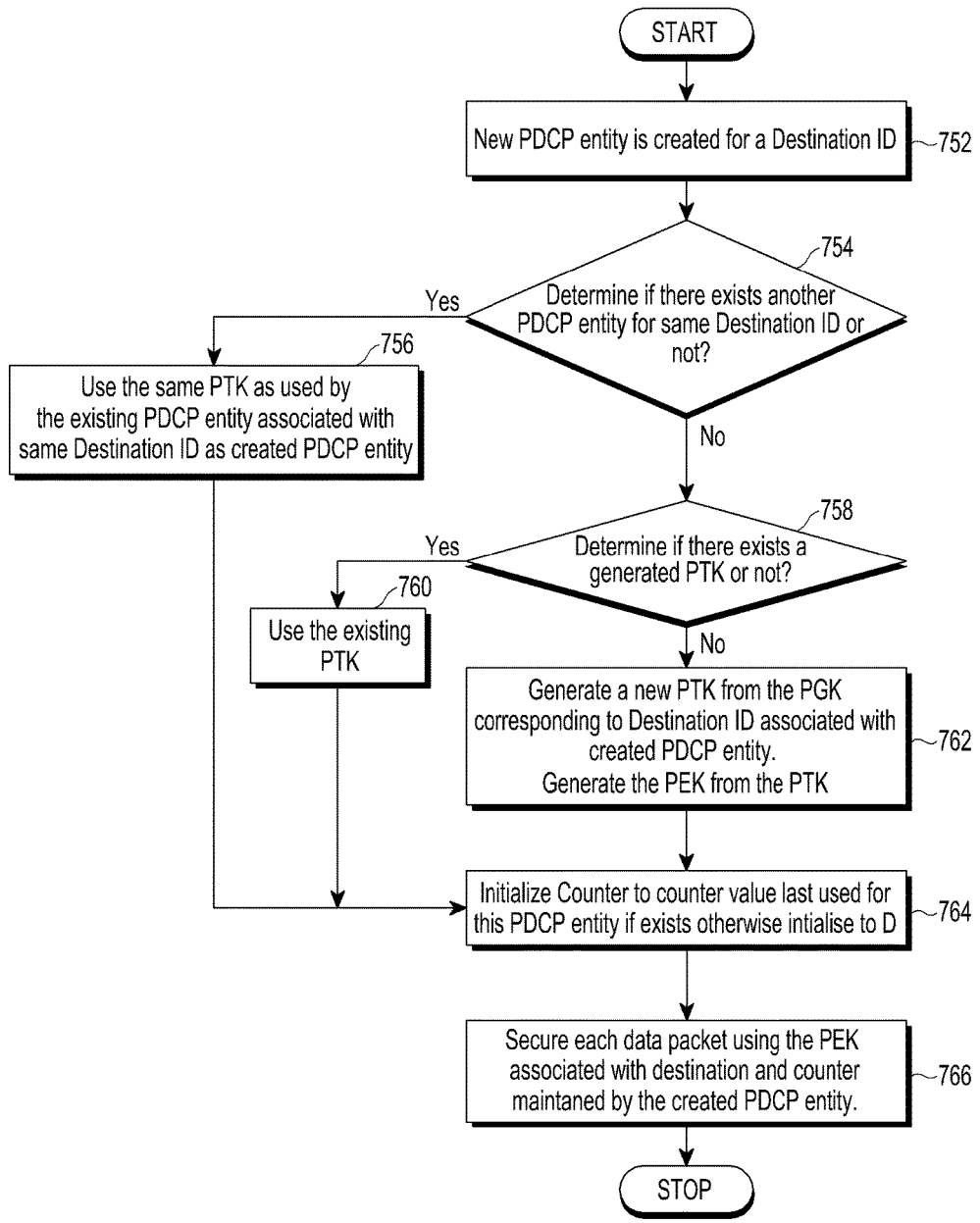

FIGS. 7A to 7C illustrate flow diagrams respectively, depicting a transmitting UE operation with respect to counter and security maintenance when a PDCP entity is created according to various embodiments of the present disclosure.

Referring to FIG. 7A, at operation 702, a new PDCP entity can be created for a destination with a destination ID. The transmitting UE can create the new PDCP entity for the destination with the destination ID. At operation 704, it is determined whether another PDCP entity exists for the same destination with the same destination ID or not. A purpose of the determination is to avoid duplication of PDCP entities along with the counter for data encryption and transmission.

If the transmitting UE identifies that one or more other PDCP entities exists for the destination, then at operation 706, the same PTK/PEK can be used by the newly created PDCP entity as used by the existing PDCP entity associated with the same destination with the destination ID as a newly created PDCP entity. If the transmitting UE identifies that there is no other PDCP entity existing for the destination, then at operation 708, it can be further determined whether an already generated PTK exists or not. If the already generated PTK does not exists, then at operation 712 a new PTK can be generated from the PGK corresponding to the destination with the destination ID associated with the created PDCP entity. Further, a PEK can also be generated for the respective PTK. At operation 714, the counter value can be initialized to zero. At operation 716, each data packet can be secured using the PEK associated with the destination, the LCID of the logical channel associated with the new PDCP entity for the service group and the counter (maintained by the created PDCP entity).

If the already generated PTK does exists, then at operation 710 the existing PTK can be used by the UE. At operation 718, the UE determines whether the PTK is same as the last used PTK for the PDCP entity. If yes, then at operation 720, the counter can be initialized to the counter last used for the respective PDCP entity.

Referring to FIG. 7B, at operation 732, a new PDCP entity can be created for a destination with the destination ID. The transmitting UE can create the new PDCP entity for the destination with the destination ID. At operation 734, it is determined whether another PDCP entity exists for the same destination with the same destination ID or not. A purpose of the determination is to avoid duplication of PDCP entities along with the counter for data encryption and transmission.

If the transmitting UE identifies that one or more other PDCP entities exist for the destination, then at operation 736, the same PTK/PEK can be used by the existing PDCP entity associated with the same destination with the destination ID as a newly created PDCP entity. At operation 744, the counter value can be initialized to zero. At operation 746, each data packet can be secured using the PEK associated with the destination, the LCID of the logical channel associated with the new PDCP entity for the service group and the counter (maintained by the created PDCP entity).

If the transmitting UE identifies that there is no other PDCP entity existing for the destination, then at operation 738, it can be further determined whether an already generated PTK exists or not. If the already generated PTK does not exist, then at operation 742 a new PTK can be generated from the PGK corresponding to the destination with the destination ID associated with the created PDCP entity. Further, a PEK can also be generated for the respective PTK. At operation 744, the counter value can be initialized to zero. At operation 746, each data packet can be secured using the PEK associated with the destination, the LCID of the logical channel associated with the new PDCP entity for the service group and the counter (maintained by the created PDCP entity).

If the already generated PTK does exist, then at operation 740 the existing PTK can be used by the UE. At operation 744, the counter value can be initialized to zero. At operation 746, each data packet can be secured using the PEK associated with the destination, the LCID of the logical channel associated with the new PDCP entity for the service group and the counter (maintained by the created PDCP entity).

Referring to FIG. 7C, at operation 752, a new PDCP entity can be created for a destination with the destination ID. The transmitting UE can create the new PDCP entity for the destination with the destination ID. At operation 754, it is determined whether another PDCP entity exists for the same destination with the same destination ID or not. A purpose of the determination is to avoid duplication of PDCP entities along with the counter for data encryption and transmission.

If the transmitting UE identifies that one or more other PDCP entities exist for the destination, then at operation 756, the same PTK/PEK can be used by the newly created PDCP entity as used by the existing PDCP entity associated with the same destination with the destination ID as a newly created PDCP entity. At operation 764, the counter value can be initialized to the counter value last used for the PDCP entity that exists. Otherwise, the counter value can be initialized to zero. At operation 766, each data packet can be secured using the PEK associated with the destination, the LCID of the logical channel associated with the new PDCP entity for the service group and the counter (maintained by the created PDCP entity).

If the transmitting UE identifies that there is no other PDCP entity existing for the destination, then at operation 758, it can be further determined whether an already generated PTK exists or not. If the already generated PTK does not exist, then at operation 762 a new PTK can be generated from the PGK corresponding to the destination with the destination ID associated with the created PDCP entity. Further, a PEK can also be generated for the respective PTK. At operation 764, the counter value can be initialized to the counter value last used for the PDCP entity that exists. Otherwise, the counter value can be initialized to zero. At operation 766, each data packet can be secured using the PEK associated with the destination, the LCID of the logical channel associated with the new PDCP entity for the service group and the counter (maintained by the created PDCP entity).

If the already generated PTK does exist, then at operation 760 the existing PTK can be used by the UE. At operation 764, the counter value can be initialized to the counter value last used for the PDCP entity that exists. Otherwise, the counter value can be initialized to zero. At operation 766, each data packet can be secured using the PEK associated with the destination, the LCID of the logical channel associated with the new PDCP entity for the service group and the counter (maintained by the created PDCP entity).

The PDCP entities are to be released once the PDCP entities are created and used for data encryption. In an embodiment of the present disclosure, the PDCP entities can be released individually or all PDCP entities can be released at a time.

In an embodiment of the present disclosure, the individual PDCP entities can be released with the following alternatives. In an alternative, the counter value is retained until the PTK/PEK is released. If the same PDCP entity is created again before the PTK/PEK is released then the counter value is initialized to the last counter value used. In another alternative, the counter value is released, wherein the counter value is set to zero when the new PDCP entity is created. In yet another alternative, the counter value can be retained, and if the same PDCP entity is created again then the counter value is initialized to last counter value used.

According to an embodiment of the present disclosure, when all of the PDCP entities are released, the PTK/PEK generated for the respective PDCP entity can be released. In an embodiment of the present disclosure, when all of the PDCP entities are released, the PTK/PEK generated for the respective PDCP entity cannot be released.

According to an embodiment of the present disclosure, instead of the LCID, the PDCP (or higher layer or some other layer) assigns a new flow/service ID to a PDCP entity. The flow/service ID may be unique across all PDCP entities or it may be unique across the PDCP entities of the same destination. The flow/service ID is used as an additional input in an encryption algorithm to provide freshness/uniqueness, because <PTK/PEK, Count> may remain the same across all PDCP entities of the same destination. In an embodiment of the present disclosure, the algorithm ID used to generate the PEK may be sent along (in a header) with the secured data packet. It is to be noted that in an embodiment of the present disclosure, only the PTK is generated wherein the PTK is used for securing the data packet instead of the PEK.

According to an embodiment of the present disclosure, an independent counter is maintained at each PDCP entity. The counter is updated for every packet received from the upper layer by the PDCP entity. Whenever the counter rolls over, the PTK/PEK associated with the PDCP entity is newly generated. The PTK/PEK is generated per PDCP entity using the PGK, the PTKID, and the group member ID of the transmitter. In an embodiment of the present disclosure, the LCID/flow ID can also be used optionally with the independent counter.

According to an embodiment, the method may include generating a plurality of PTK and PEK for each PDCP entity associated with the destination ID of the service group. The method further may include initializing the packet counter associated with each PDCP entity to zero, wherein the PTK and PEK are generated for each PDCP entity based on the PGK, the PGKID and a group member ID of a transmitter. The method further may include releasing the PTK and the PEK when the packet counter value associated with the PDCP entity is released.

Figure 8:
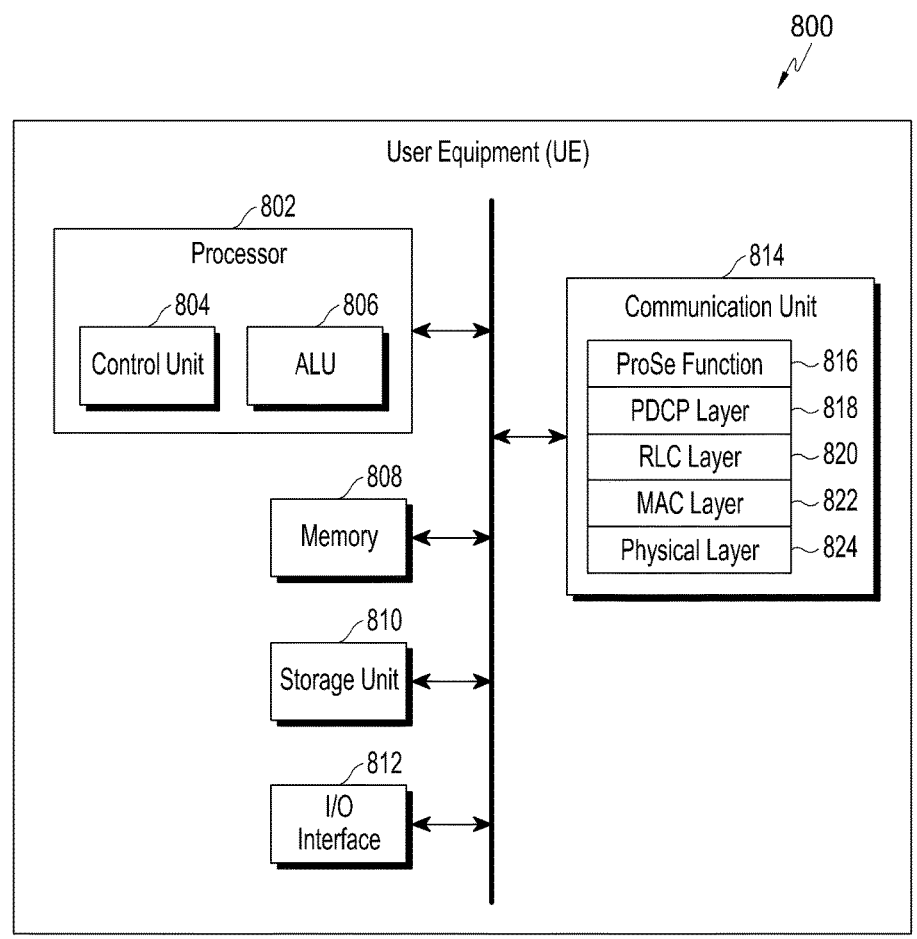
FIG. 8 is a schematic block diagram illustrating a system of counter management and security key update for D2D group communication according to an embodiment of the present disclosure.

FIG. 8 is a schematic block diagram illustrating a UE for counter management and security key update for D2D group communication according to an embodiment of the present disclosure.

Referring to FIG. 8, the UE 800 comprises at least one processor 802 that is equipped with a control unit 804 and an arithmetic logic unit (ALU) 806, a memory 808, a storage unit 810, an input/output (I/O) interface 812, and a communication unit 814. The processor 802 is responsible for processing the instructions of the algorithm. The processor 802 receives commands from the control unit 804 in order to perform its processing. Further, any logical and arithmetic operations involved in the execution of the instructions are computed with the help of the ALU 806.

The overall computing environment of the UE 800 can be composed of multiple homogeneous and/or heterogeneous cores, multiple central processing units (CPUs) of different kinds, special media and other accelerators. The processor 802 is responsible for processing the instructions of the algorithm. Further, the plurality of processors 802 may be located on a single chip or over multiple chips.

The algorithm comprising instructions and codes required for the implementation are stored in either the memory 808 or the storage unit 810 or both. At the time of execution, the instructions may be fetched from the corresponding memory 808 and/or storage unit 810 and executed by the processing unit 802.

Further, the UE 800 may include the communication unit 814 for data reception, encryption, and transmission. The communication unit 814 may include a ProSe function 816, a PDCP layer 818, an RLC layer 820, a MAC layer 822, and a physical layer 824. The ProSe function 816 allows the UE 800 to use proximity services while communicating with other UEs in D2D communication. The PDCP layer 818 creates PDCP entities that are used by the UE during D2D group communication. The RLC layer 820 controls data transfer between the UE 800 and the other UEs in the D2D communication. Further, the RLC layer 820 also takes care of error correction, protocol error detection, and connection re-establishment.

The MAC layer 822 can provide addressing and channel access control mechanisms to the UE 800. Further, the MAC layer 822 can also provide the LCID to the UE 800. The physical layer 824 can be a combination of both hardware and software components that act as a means for transmitting data packets over a network.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of a user equipment (UE) in a communication system, the method comprising:
generating a second security key which is based on a first security key for a group for a group communication;
generating a third security key based on the second security key; and
protecting data based on at least one of the third security key and an identifier (ID) associated with a first entity,
wherein the second security key is derived when the first entity for the group is created, and at least one other entity created for the group uses the second security key.

2. The method of claim 1, wherein the second security key is released after all entities created for the group are released.

3. The method of claim 1, wherein the first security key includes a proximity-based services (ProSe) group key (PGK), the second security key includes a ProSe traffic key (PTK), the third security key includes a ProSe encryption key (PEK), and the entities include packet data convergence protocol (PDCP) entities.

4. A user equipment (UE) in a communication system, the UE comprising:
at least one processor configured to:
generate a second security key which is based on a first security key for a group for a group communication,
generate a third security key based on the second security key, and
protect data based on at least one of the third security key and an identifier (ID) associated with a first entity,
wherein the second security key is derived when the first entity for the group is created, and at least one other entity created for the group uses the second security key.

5. The UE of claim 4, wherein the second security key is released after all entities created for the group are released.

6. The UE of claim 4, wherein the first security key includes a proximity-based services (ProSe) group key (PGK), the second security key includes a ProSe traffic key (PTK), the third security key includes a ProSe encryption key (PEK), and the entities include packet data convergence protocol (PDCP) entities.

7. The method of claim 1, wherein the third security key is released after all entities created for the group are released.

8. The method of claim 1, wherein the ID is used if a same second security key is used for the group for the group communication.

9. The method of claim 8, wherein the protecting data based on the at least one of the third security key and the ID associated with the first entity comprises ciphering the data based on the ID associated with the first entity.

10. The method of claim 8, wherein the ID includes a logical channel ID (LCID), the first security key includes a proximity-based services (ProSe) traffic key (PTK), the second security key includes a ProSe group key (PGK), the third security key includes a ProSe encryption key (PEK), and the entities include packet data convergence protocol (PDCP) entities.

11. The UE of claim 4, wherein the third security key is released after all entities created for the group are released.

12. The UE of claim 4, wherein the ID is used if a same second security key is used for the group for the group communication.

13. The UE of claim 12, wherein the protecting data based on the at least one of the third security key and the ID associated with the first entity comprises ciphering the data based on the ID associated with the first entity.

14. The UE of claim 12, wherein the ID includes a logical channel ID (LCID), the first security key includes a proximity-based services (ProSe) traffic key (PTK), the second security key includes a ProSe group key (PGK), the third security key includes a ProSe encryption key (PEK), and the entities include packet data convergence protocol (PDCP) entities.

* * * * *